United States Patent
Battaglia

Patent Number: 6,085,456
Date of Patent: Jul. 11, 2000

[54] SHEET METAL FISH HOOK

[76] Inventor: Vincent P Battaglia, 209 Banks Rd., Easton, Conn. 06612

[21] Appl. No.: 08/892,452

[22] Filed: Jul. 14, 1997

[51] Int. Cl.$^7$ ..................................................... A01K 83/00
[52] U.S. Cl. .......................... 43/43.16; 43/44.8; 43/44.82
[58] Field of Search .................. 43/43.16, 44.8, 43/44.82

[56] References Cited

U.S. PATENT DOCUMENTS

| | | | |
|---|---|---|---|
| 1,513,400 | 10/1924 | Koski | 43/43.16 |
| 2,334,613 | 11/1943 | Dunkelberger | 43/44.82 |
| 2,345,197 | 3/1944 | Hirsch | 43/44.82 |
| 2,841,914 | 7/1958 | Butler | 43/43.16 |
| 3,465,466 | 9/1969 | Showalter | 43/44.8 |
| 3,564,748 | 2/1971 | Malecki | 43/44.82 |
| 3,564,749 | 2/1971 | Fujii | 43/43.16 |
| 4,930,248 | 6/1990 | Owens | 43/43.16 |
| 5,274,947 | 1/1994 | Griffiths | 43/44.8 |

*Primary Examiner*—Kurt Rowan
*Attorney, Agent, or Firm*—H Giber Lehmann; K. Gibner Lehmann

[57] ABSTRACT

A fish hook in the form of a flat, hook-shaped, sheet metal stamping which is flat-stamped from relatively thin, flat sheet-metal stock, said flat stamping having a planar, hook-shaped portion and an elongate shank portion both of which have rectangular cross-sectional configurations. The hook-shaped portion includes a bill portion both of which portions are disposed in the same plane as the shank portion, and the bill portion is integral with the hook-shaped portion and also has a rectangular cross sectional configuration. The said shank portion of the hook has a seamless eye which enables it to be attached to a fish line.

8 Claims, 1 Drawing Sheet

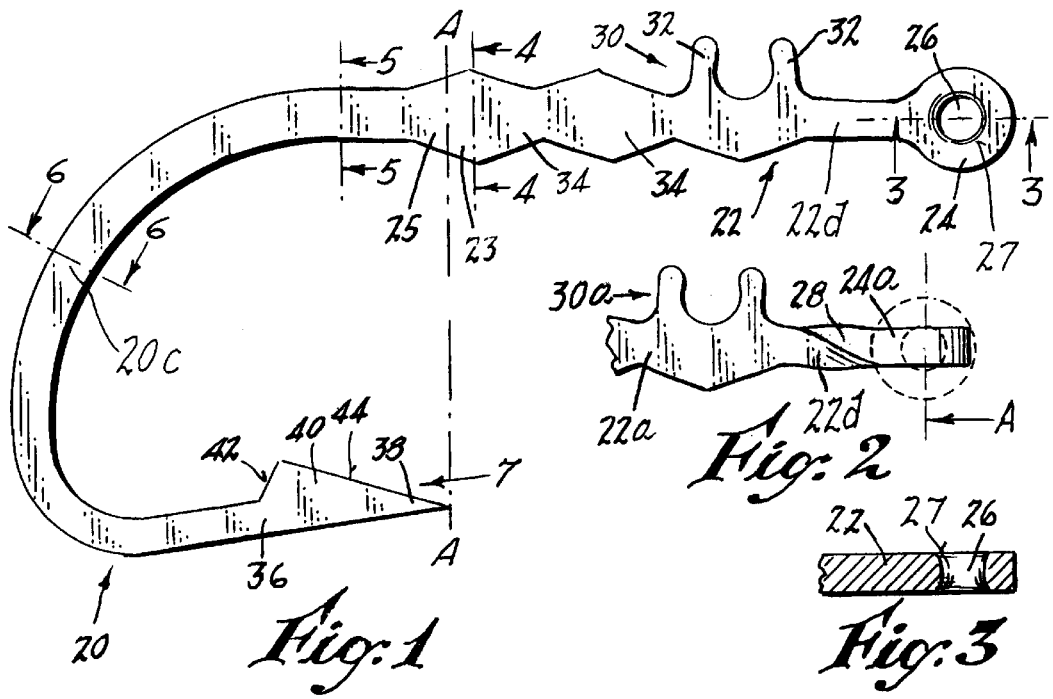
Fig. 1  Fig. 2  Fig. 3
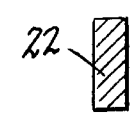  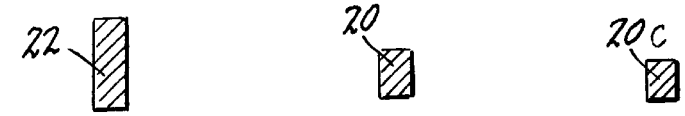 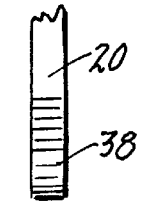
Fig. 4  Fig. 5  Fig. 6  Fig. 7
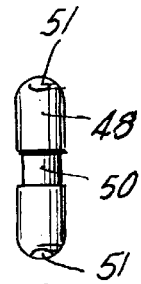 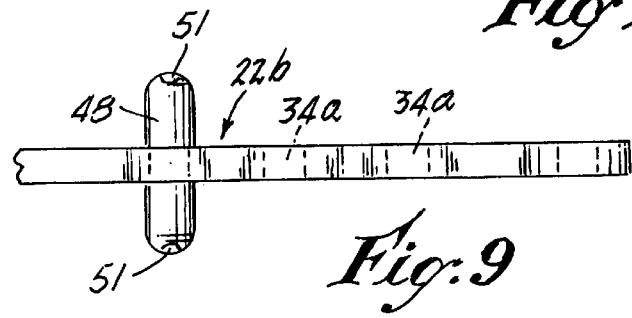
Fig. 10  Fig. 9
 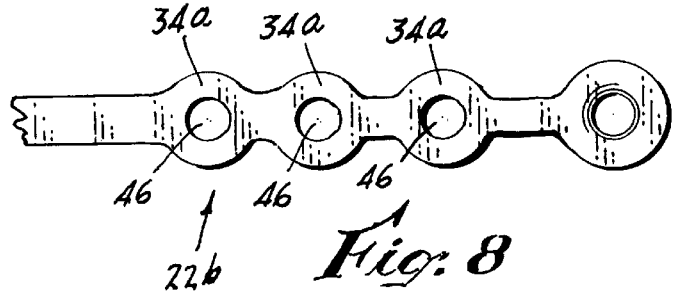
Fig. 11  Fig. 8

SHEET METAL FISH HOOK

NO CROSS REFERENCES TO RELATED APPLICATIONS/PATENTS

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to fish hooks, and more particularly to low-cost fish hooks which are stamped out of sheet metal.

2. Description of the Related Art Including Information Disclosed under 37 CFR Sections 1.97–1.99

The following prior art references are hereby cited as being of interest in the field to which the present invention pertains:

| | | |
|---|---|---|
| Nor. 93,059 | 2,501,210 | 2,841,914 |
| 3,564,749 | 4,060,928 | 4,028,838 |
| 5,537,774 | | |

Norwegian Patent No. 93,059 discloses a fish hook formed from an elongate narrow straight strip of sheet metal which has been first twisted into a screw configuration and thereafter formed into the shape of a fish hook. A number of distinct and separate operations is involved in the formation of this hook, resulting in labor and handling costs which make the hook expensive to fabricate. The final configuration of the hook also results in certain limitations as to its usefulness in different situations and environments.

U.S. Pat. No. 2,501,210 discloses a composite fish hook having a swivel-mounted spring-charged barb arm in a latch arrangement that is released when the angler pulls on a short piece of line that is disposed at the shank of the hook. This is a costly, semi-automatic mechanism which is also susceptible to snagging of the parts, and the patent makes no reference to the production of low-cost fish hooks.

U.S. Pat. No. 2,841,914 relates to barbless fish hooks which are easy to disengage from caught fish, enabling the same to be returned uninjured to the water. No mention is made of reducing costs, eliminating labor, etc. to bring down the price of the hooks.

U.S. Pat. No. 3,564,749 relates to fish hooks which are formed from stamped metal blanks. However, these fish hooks require secondary operations to be performed on the blanks after the initial stamping of the same, and such operations entail labor and additional tooling and handling which introduces high cost factors whereby the ultimate price of the fish hooks cannot compare with the price of fish hooks which are machine-produced to their final configuration, except for add-ons such as lures, weights and the like.

U.S. Pat. No. 4,028,838 reveals various fish-hook configurations characterized by constricted throat sections as distinguished from reverse-acting barbs, whereby improved holding power is had without the use of barbs that complicate the removal of the hook and increase damage to the fish. Nothing is disclosed with respect to reduction in cost, or elimination of labor, or automatic machine production.

U.S. Pat. No. 4,060,928 is directed to the provision of fish hooks that are caused to rotate within a fishes mouth, thereby to prevent hooking the fish in the soft side portion of the mouth. The hooks of this patent are also intended for use with artificial worms whereby the worms move through the water without twisting of the lines. No object is mentioned, regarding reduction of the cost of the hooks, or high production-low labor techniques.

Finally, U.S. Pat. No. 5,537,774 reveals the use of a swivel ball mounting or coupling for fish-hooks, to enable rotation of the hooks to attract fish as the hook is pulled through the water. There is no disclosure of metal stamping of fish hooks to achieve high production, elimination of labor, and lower costs.

The above disadvantages and drawbacks of prior fish hooks are obviated by the present invention, and one object of the invention is to provide an improved stamped sheet metal fish hook which can be essentially fully fabricated to the initial basic fish-hook configuration by automatic metal-stamping and metal-working machinery, without the need for labor, costly secondary forming operations and the like, thereby to achieve the ultimate in low-cost production.

Another object of the invention is to provide an improved stamped sheet metal fish-hook as above characterized, wherein the tooling is mostly in the form of simple metal-stamping tools, optionally in simple progressive dies.

A further object of the invention is to provide an improved fish hook in accordance with the foregoing, wherein simplified means are provided which facilitate the adding of attachments to the hook, such as lures, spinners, weights etc.

An additional object of the invention is to provide a fish hook as above set forth, which is sturdy and reliable in its operation, and not likely to malfunction during use.

A feature of the invention is the provision of an improved, stamped sheet metal fish hook of the kind indicated above, wherein the likelihood of fraying or breaking of the fish line is minimized.

Another feature of the invention is the ability to readily alter, in the stamping tools, the shaping and characteristics of the barb, thereby to meet various conditions of use of the hook.

Other features and advantages will hereinafter appear.

In the accompanying drawings, showing several embodiments of the invention:

FIG. 1 is a side elevational view of the present improved fish hook, greatly enlarged.

FIG. 2 is a fragmentary side elevational view of the eye portion of the fish hook, illustrating a modification of the invention. The extremity of the shank portion of the hook is shown in broken outline before a twist is given to the shank portion in the progressive tooling of the hooks.

FIG. 3 is a fragmentary section, taken on the line 3—3 of FIG. 1.

FIG. 4 is a transverse sectional view of the shank portion of the fish hook of FIGS. 1 and 3, as taken on the line 4—4 of FIG. 1.

FIG. 5 is a transverse sectional view of the U-shaped portion of the fish hook, taken on the line 5—5 of FIG. 1.

FIG. 6 is a transverse sectional view of the U-shaped portion of the fish hook, taken on the line 6—6 of FIG. 1.

FIG. 7 is an end elevational view of the sharp hook end, looking in the direction indicated by the arrow "7" in FIG. 1.

FIG. 8 is a fragmentary side elevational view of the shank portion of the fish hook, illustrating another modification of the invention.

FIG. 9 is an edge elevational view of the portion of the fish hook illustrated in FIG. 8 but with a weight member added.

FIG. 10 is a side elevational view of the weight member of FIG. 9, for use with the fish hook of FIGS. 8 and 9, and FIG. 11 is a plan view of a hook illustrating a modification of the invention.

Referring first to FIGS. 1 and 3–7, the present improved sheet metal fish hook is constituted as an integral, one piece sheet metal stamping that is essentially made in a number of consecutive automatic steps, using a progressive punch and die technique and working with relatively thin, flat sheet metal stock.

As seen in FIG. 1, the entire stamping has generally the form of a hook which can be confined mostly in a predetermined plane and which is stamped out laterally of said plane while the sheet metal stock is being supported in said plane.

The stamped piece, after the blanking, has a substantially U-shaped hook portion 20 (that portion which is disposed to the left of the line A—A in FIG. 1) and an elongate relatively straight shank portion 22 (that portion which is disposed to the right of the line A—A in FIG. 1) both of said portions having essentially rectangular cross sectional configurations as shown in FIGS. 5 and 6. The shank portion 22 at one of its ends 23 is joined to and extends from one leg 25 of the U-shaped hook portion 20.

The shank portion 22 is provided with means 24 in the form of a stamped seamless eye portion which has an aperture or eye 26 that enables the hook to be attached to a fish line (not shown) as by tying the line to the eye portion 24.

In the embodiment of the invention shown in FIG. 2, the eye portion 24a is disposed in a 90-degree plane with respect to the plane of the rest of the shank portion 22a and the U-shaped hook portion, as by making a twist 28 in the shank portion 22a. This is preferably automatically done in the progressive die, after the aperture 26 has been punched in the eye portion 24.

The aperture 26 is shaped, preferably by deburring and burnishing tools which can be incorporated in the progressive tooling of the fish hooks, to provide rounded edges as seen in FIG. 3, so as to minimize fraying or cutting of the fish line after it has been tied to the hook.

The invention further provides a clip mounting 30 comprising a pair of fingers 32 which are integral with the shank portion 22 and which are adapted to receive between them articles such as mounted artificial fish eyes (not shown) intended to act as bait and attract larger fish.

For the purpose of reliably securing fish lures and the like to the hook, the shank portion 22 is formed with protuberances or enlargements 34, preferably of pointed configuration, which are located closely adjacent the eye portion 24. The enlargements are involved with the tying of lures to the hook, and prevent slippage of the lures along the shank portion 22.

In accordance with the invention, in the embodiment of FIG. 1, the hook portion 20 of the fish hook is made tapering, with the greatest cross dimensions occurring nearest the juncture of the portions 23 and 25. This provides increased strength where it is needed most, i. e. at that point where the shank and hook portions merge with each other and thereafter where the hook portion progresses from such point.

As shown, the hook portion 20 progresses to a bill configuration or portion 36 which terminates at a sharp point 38 that is configured with a barb 40 characterized by chisel-angled surfaces 42 and 44. The barb 40 can have various shapes and different-angled faces, or the barb can be eliminated entirely, depending on the fishing requirements. The barb shape is determined by the shape of the punches and dies. Thus, all different configurations can be readily obtained, within the capabilities of the automatic progressive punch and die tooling.

It will now be seen that I have provided improved fish hooks which are especially economical to fabricate by automatic machinery, eliminating the use of much of the labor and handling. Sheet metal stock is fed into a machine, then stamped, punched or otherwise worked on to obtain the result of an essentially finished hook configuration which can be discharged from the machine at its output end. Fish hooks produced in accordance with the invention are especially inexpensive to fabricate, strong and sturdy, produceable in a variety of shapes and configurations to meet different conditions of use, and have many other advantages which will become apparent from their use.

Another embodiment of the invention is illustrated in FIGS. 8–10. In this embodiment the shank portion 22b of the hook has enlargements 34a which are provided with apertures 46 that are characterized by tapered walls which are adapted to receive and hold elongate metal weights 48. The weights 48 can be press-fitted into the apertures 46, and have reduced-diameter center portions or undercuts 50 to lock the weights in place in the apertures, and also simulated eyes 51 at its ends.

A still further embodiment of the invention is illustrated in FIG. 11. The sheet metal fish hook shown therein is similar in most respects to that of FIGS. 1–7 except that the throat or yoke portion 54 has been considerably thickened or widened, adding much more strength to the curved portion of the hook. As shown, the width of the yoke portion 54 is a multiple of the respective average widths of the legs of the hook.

In all of the embodiments of the invention shown it will now be understood that the present fish hooks are unique and improved by having been stamped from sheet metal so as to be economically produced automatically in large quantities using progressive punch and die techniques. The hooks are strong and durable, efficient in their operation, and capable of use for many purposes and with different lures and attachments.

Other variations and modifications are possible within the scope of the appended claims.

What is claimed is:

1. A fish hook comprising:
    A) a flat sheet metal stamping which is completely stamped from a flat sheet of metal to its finished shape, said stamping having a uniform thickness throughout and having the form of a hook which lies in a predetermined plane and which is completely and fully formed by being stamped laterally from relatively thin flat sheet metal stock,
    B) said flat stamping having a U-shaped hook portion, and having an elongate straight shank portion which at one end is joined to said U-shaped hook portion, both of said portions having rectangular cross-sectional configurations,
    C) said U-shaped hook portion including a bill portion terminating in a point having a barb, at least part of said U-shaped book portion and bill portion being disposed substantially in the same plane as the shank portion, said bill portion being integral with said U-shaped hook portion and having a substantially rectangular cross sectional configuration, D) said shank portion at another end having an eye portion with an aperture for attachment to a fish line, E) said shank portion having a pair of spaced-apart fingers adjacent said eye portion extending perpendicular to said shank and adapted to receive between them a fish attractant, said shank having adjacent said fingers a plurality of pointed lateral enlargements on opposite sides of said shank to minimize the likelihood of slippage of a lure that has been wrapped around said shank portion, said fingers and said enlargements integrally formed with said fish hook.

2. A fish hook as set forth in claim 1, wherein:

a) said shank portion having a twist in it at a location close to said eye, and b) said shank portion which has said eye lying in a plane which is substantially at right angles to the plane of the shank portions which do not have the eye.

3. A fish hook as set forth in claim 2, wherein said portion of the shank which has the eye is seamless.

4. A fish hook as set forth in claim 1, wherein the said hook portion of the fish hook is tapered along its length.

5. A fish hook as set forth in claim 1, wherein said bill portion of the fish hook is provided with an integral barb at its side edge.

6. A fish hook as set forth in claim 1, wherein said bill portion of the fish hook has a barb characterized by a angled surfaces.

7. A fish hook as set forth in claim 1, wherein:

a) the means which enables the shank portion to be attached to a fish hook comprises an eye which is punched out of the shank portion, b) the edges of said eye being rounded to prevent fraying of the fish line.

8. A fish hook as set forth in claim 1, wherein said fish hook has a widened yoke portion.

* * * * *